(12) United States Patent
Carney Landow (10) Patent No.: US 10,154,313 B2
(45) Date of Patent: Dec. 11, 2018

(54) PRESELECTING FUTURE VIDEO CONTENT FOR DOWNLOAD

(71) Applicant: EchoStar Technologies L.L.C., Englewood, CO (US)

(72) Inventor: Kate Megan Carney Landow, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 14/631,545

(22) Filed: Feb. 25, 2015

(65) Prior Publication Data

US 2016/0249105 A1 Aug. 25, 2016

(51) Int. Cl.
| H04N 5/445 | (2011.01) |
| H04N 21/472 | (2011.01) |
| H04N 21/239 | (2011.01) |
| H04N 21/482 | (2011.01) |
| H04N 21/266 | (2011.01) |

(52) U.S. Cl.
CPC ... *H04N 21/47202* (2013.01); *H04N 21/2393* (2013.01); *H04N 21/4828* (2013.01); *H04N 21/26616* (2013.01)

(58) Field of Classification Search
CPC ........... H04N 21/26291; H04N 21/262; H04N 21/26241; H04N 21/278; H04N 21/4334; H04N 21/47202; H04N 21/47214
See application file for complete search history.

(56) References Cited

U.S. PATENT DOCUMENTS

| 5,629,733 | A | * | 5/1997 | Youman | ............. H04N 5/44543 345/169 |
| 5,825,876 | A | | 10/1998 | Peterson, Jr. | |
| 6,282,713 | B1 | | 8/2001 | Kitsukawa et al. | |
| 6,574,424 | B1 | | 6/2003 | Dimitri et al. | |
| 2001/0027560 | A1 | | 10/2001 | Simon | |
| 2002/0032905 | A1 | | 3/2002 | Sherr et al. | |
| 2002/0059610 | A1 | * | 5/2002 | Ellis | ................... H04N 5/44543 725/58 |
| 2002/0065929 | A1 | | 5/2002 | Kamentsky et al. | |
| 2002/0198963 | A1 | | 12/2002 | Wu et al. | |
| 2003/0005437 | A1 | | 1/2003 | Feuer et al. | |
| 2003/0084461 | A1 | | 5/2003 | Hoang | |
| 2004/0103444 | A1 | | 5/2004 | Weinberg et al. | |
| 2004/0133923 | A1 | | 7/2004 | Watson et al. | |

(Continued)

FOREIGN PATENT DOCUMENTS

GB 2405297 B 2/2005

OTHER PUBLICATIONS

"Telecommunications and Internet Converged Services and Protocols for Advanced Networking (TISPAN); Service Layer Requirements to Integrate NGN Services and IPTV," ETSI Standards, Draft ETSI TS 181 016, V0.0.5, Feb. 2007, 30 pages.

(Continued)

*Primary Examiner* — James R Sheleheda
*Assistant Examiner* — Timothy R Newlin
(74) *Attorney, Agent, or Firm* — Seed IP Law Group LLP (57) ABSTRACT

Systems and methods are disclosed that enable a user to identify video content that has not yet been created and to have that content downloaded from a video content provider when that video content has been newly created and available for download.

20 Claims, 7 Drawing Sheets

(56) References Cited

U.S. PATENT DOCUMENTS

| | | | |
|---|---|---|---|
| 2004/0163114 A1* | 8/2004 | Rodriguez | G06F 3/0482 |
| | | | 725/87 |
| 2004/0268410 A1* | 12/2004 | Barton | G06Q 30/02 |
| | | | 725/119 |
| 2005/0071874 A1* | 3/2005 | Elcock | H04N 5/44543 |
| | | | 725/53 |
| 2007/0162502 A1* | 7/2007 | Thomas | G06F 17/3082 |
| 2007/0174336 A1* | 7/2007 | Day | H04N 7/17318 |
| 2007/0283392 A1 | 12/2007 | Tsusaka et al. | |
| 2008/0168515 A1 | 7/2008 | Benson et al. | |
| 2009/0113496 A1 | 4/2009 | Kummer | |
| 2009/0293098 A1* | 11/2009 | Pirani | H04N 7/17318 |
| | | | 725/132 |
| 2010/0186025 A1 | 7/2010 | Thomas et al. | |
| 2011/0016492 A1* | 1/2011 | Morita | H04N 5/44543 |
| | | | 725/58 |
| 2011/0296456 A1* | 12/2011 | Pandala | G06F 17/30029 |
| | | | 725/34 |
| 2012/0019732 A1* | 1/2012 | Lee | G06F 17/30274 |
| | | | 348/732 |
| 2012/0079537 A1* | 3/2012 | Kalidindi | H04N 21/47202 |
| | | | 725/40 |
| 2012/0096499 A1* | 4/2012 | Dasher | H04N 21/4223 |
| | | | 725/87 |
| 2012/0284738 A1* | 11/2012 | Narasimhan | H04H 20/38 |
| | | | 725/16 |
| 2013/0276022 A1* | 10/2013 | Tidwell | H04N 21/2547 |
| | | | 725/34 |
| 2013/0326562 A1* | 12/2013 | Bi | H04N 21/47214 |
| | | | 725/58 |
| 2015/0150045 A1* | 5/2015 | Shovkoplias | H04N 21/44222 |
| | | | 725/34 |
| 2016/0037227 A1* | 2/2016 | Benn | H04N 21/4828 |
| | | | 725/53 |
| 2016/0182954 A1* | 6/2016 | Nguyen | H04N 21/4668 |
| | | | 725/10 |

OTHER PUBLICATIONS

Benson, "Method for Delivering a Media Collection for Rental of Individual Media Elements," U.S. Appl. No. 60/877,411, filed Dec. 26, 2006, 24 pages.

Extended European Search Report, dated Apr. 14, 2009, for corresponding EP Application No. 08167528.2-2223, 10 pages.

Wang et al., "The MPEG-21 Rights Expression Language and Rights Data Dictionary," *IEEE Transactions on Multimedia* 7(3):408-417, Jun. 2005.

* cited by examiner

PRESELECTING FUTURE VIDEO CONTENT FOR DOWNLOAD

BACKGROUND

Technical Field

The present disclosure relates to the field of video content distribution and, in particular, to systems and methods for identifying future video content that has not yet been created and downloading that content for viewing once the content has been created.

Description of the Related Art

Ordering existing video content such as movies and series episodes from a video-on-demand service and downloading the video content to a set-top box for viewing is known in the art. When a user enters a video-on-demand service operated by a video content provider, for example DISH® a catalog of available video content titles is displayed that allows the user to search for and to select a movie and request that it be downloaded to the set-top box for later viewing. Ordering a movie or any other video content in this way is possible when the video content to be downloaded has already been created and is available for downloading from the video-on-demand service.

In addition, recording programming that is broadcast to a set-top box or other device from a content distributor (e.g., DISH®) as a part of a live program feed is also known in the art. For example, a user's set-top box receives programming schedules from the content distributor and presents that information to the user in the form of an electronic programming guide. The electronic programming guide is typically presented on a television display connected to the set-top box, and allows the user to view the program titles that will be broadcast by the content provider on certain channels during certain times. The user may then select a program from electronic programming guide using a remote control device to be recorded by the set-top box when that scheduled program is broadcast.

BRIEF SUMMARY

This disclosure describes systems and methods to identify and download future video content from a video-on-demand service of a video content provider once the identified content has been created and made available for download on the service. This allows a user to pre-order video content from a video-on-demand service before the video content has been created. Examples of a video-on-demand service include pay-per-view or other content download services where a file containing the entire video content of a program, for example a movie or a series episode, is available to be downloaded from the service to a device for viewing. This is in contrast to a broadcast system where video content is live broadcast through channels that may be viewed or recorded by a user. Devices that can receive the downloaded video content include a set-top box, smartphone, personal computer, tablet or other storage and viewing device. The content may also be downloaded to a cloud storage device or other content storage or delivery service accessible to a user device.

Examples of future video content include an advertised movie that has not yet been created or future episodes in a series that have not been filmed or may not have even been funded for production. The user may learn about future video content through promotional literature or other advertisements such as an advertised movie featured in a "coming soon" attraction, or the user may anticipate that prequels or sequels of certain movies or series will eventually be created.

Future video content may be identified by search criteria that identify attributes of the future content once the content has been created. These attributes include, but are not limited to, program title, series title, episode title, summary, name of the studio, name of the producer, name of the director, name of the play on which the content is based, name of one or more cast members, genre and the like. Search criteria for future video content may also be determined based on an analysis of user profile information such as age, sex, marital status, and income; viewing habits of the user; purchasing habits of the user and the like.

Once search criteria have been established, one or more video content provider locations are regularly searched to determine if content having attributes that match the search criteria has been newly created and is available for download. In some implementations, the search criteria are entered by the user using a remote control that interacts with the user's set-top box. In other implementations, the user enters the search criteria using a content provider website or using an application running on a personal computer, smartphone, tablet or other access device.

Once the future content has been created and located by searching the video content provider sites using the search criteria, the user is notified when matching content is available, and the matching content is downloaded for viewing at the user's set-top box or other device. The user may indicate how the download is to occur, for example, scheduling the download during off-peak hours to minimize the cost of the download or disruption of other Internet services on the download device due to bandwidth constraints. In other examples, the set-top box can be instructed to connect to the video content provider or other video-on-demand service and to check for downloads at certain times or during certain conditions throughout the day.

DETAILED DESCRIPTION

Figure 1:
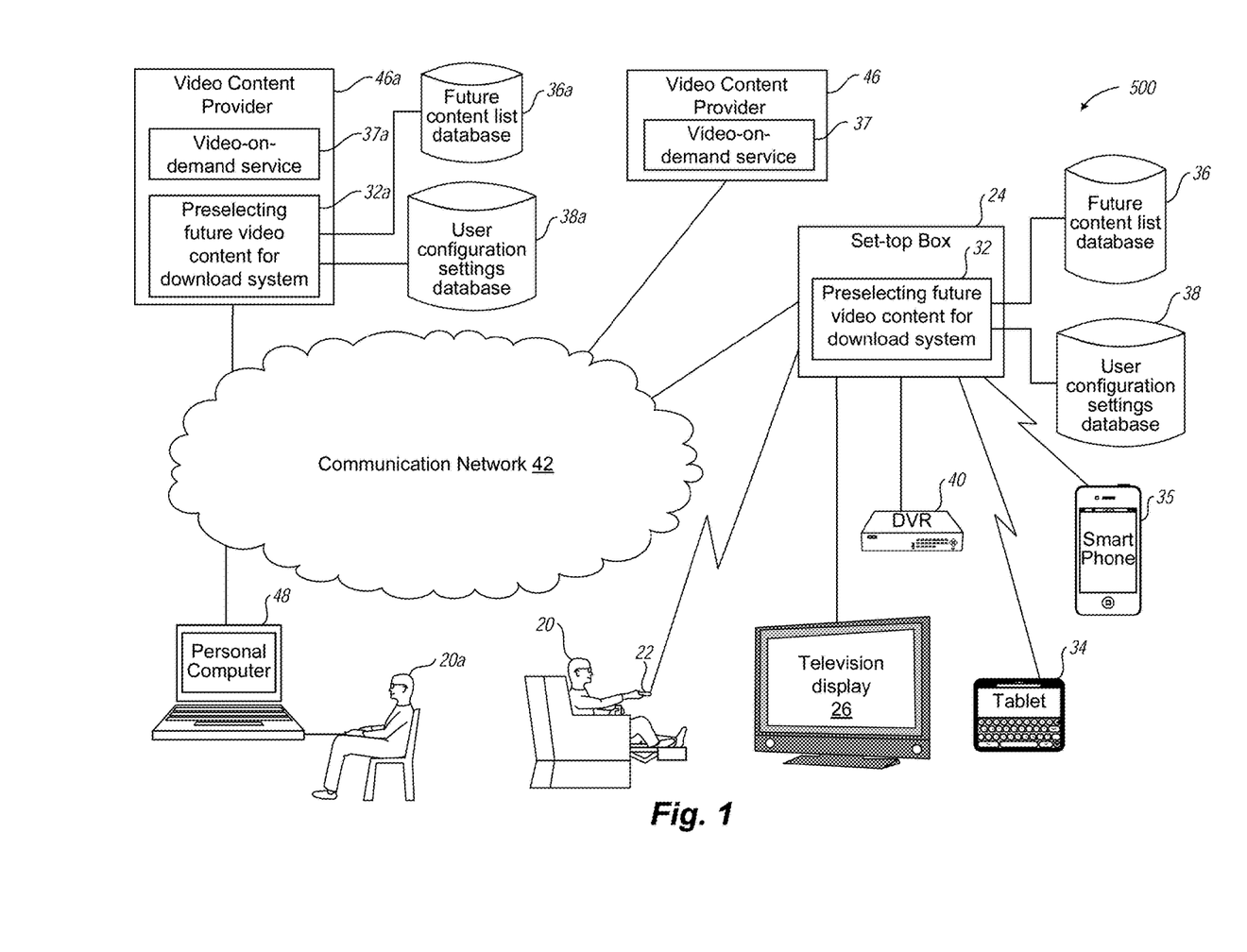
FIG. 1 contains a diagram that shows an implementation of a system that provides preselecting future video content for download.

FIG. 1 contains diagram 500 that shows one implementation of a system that provides preselecting future video content for download. In one variation of this implementation, a user 20 uses remote control 22 to interact with set-top box 24 that is connected to a television display 26. The set-top box 24 is running the preselecting future video content for download system 32 that the user 20 interacts with to identify future content to download from video-on-demand services 37, 37a within video content providers 46, 46a once the identified future video content has been created and becomes available for downloading. In other variations, the user 20 may use a tablet 34 or a smartphone 35 to communicate with the preselecting future video content for download system 32. A future content list database 36 stores information received from the user 20 that identifies audio-visual content that is to be downloaded once the content has been created. The data in the future content list database 36 includes search criteria used to identify newly available content. The user configuration settings database 38 includes information about user 20 preferences including how to notify the user 20 when newly created content is available and to which device or location the newly available content is to be downloaded. The future content list database 36 and the user configuration settings database 38 communicate with the preselecting future video content for download system 32 running within set-top box 24.

A digital video recorder 40 attached to set-top box 24 receives and stores downloaded video content over the communications network 42. In some variations, the digital video recorder 40 is a component within set-top box 24. In other variations, other devices such as tablet 34 or a smartphone 35 can be used to receive downloaded audiovisual content that has been newly created.

The preselecting future video content for download system 32 reads information from the future content list database 36 and user configuration settings database 38 to determine the search criteria to use and the locations to search for newly-created video content the user 20 would like to view. The preselecting video content for download system 32 is then able to search, using a communications network 42, video content provider 46, 46a locations to determine whether the desired video content has been newly created and is available for download. The communications network 42 may include a number of different communication systems using a variety of protocols, including Internet and private communications protocols used by content subscription services, for example by DISH®.

A video content provider 46 is an entity that either creates video content or distributes video content via the communications network 42. Examples of a video content provider 46 include DIRECTV™, DISH®, traditional broadcast networks such as CBS, NBC, ABC and Fox, as well as Internet-based content distributors such as Netflix™, Amazon Prime Video™, YouTube™ and Twitch™. The video content includes but is not limited to movies, television series episodes such as Orphan Black, sports events, documentaries, cartoons, news segments and the like.

In another variation of the implementation, a video content provider 46a provides a preselecting video content for download system 32a that operates as a part of a video content provider 46a website that is accessible to user 20a via communications network 42. The user 20a uses a personal computer 48 to access via a website the preselecting future video content for download system 32a running as part of the video content provider 46a. When interacting with the preselecting future video content for download system 32a, the user 20a will cause the future content list database 36a and user configuration settings database 38a to be updated with the user's 20a desired future content and where the content should be downloaded when created. The preselecting future video content for download system 32a will then regularly search the video content provider 46a site for the desired video content and download the content when it becomes available for viewing.

In one or more implementations, there may be different capabilities to access content using the preselecting video content for download systems 32, 32a available to different users 20, 20a depending upon the type of subscriptions each user 20, 20a has with various video content providers 46, 46a. For example, a first video content provider may allow the user to access video content from HBO™ and Showtime™ but not Cinemax™, and a second video content provider may allow the user to access only video content from Encore™.

Figure 2:
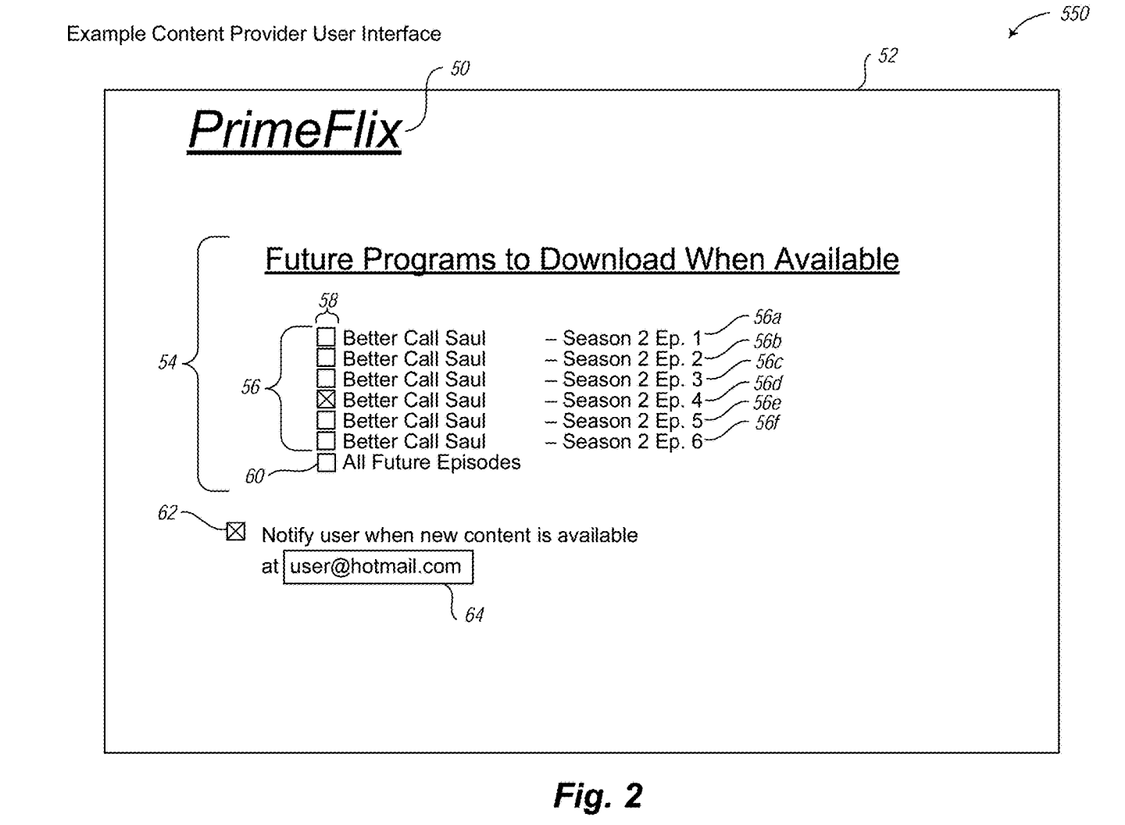
FIG. 2 contains an example user interface screen that shows an implementation of a user interface for preselecting future video content for download within a content provider site.

FIG. 2 contains an example user interface screen 550 that shows an implementation of a user interface for preselecting future video content for download within a video content provider site. In this example, the user 20a accesses the website of a video content provider 46a to identify the future video content the user 20a wishes to have downloaded from the video-on-demand service 37a by indicating the attributes of the desired content that will be incorporated into search criteria. Here, the name of a fictional video content provider "PrimeFlix" 50 is at the top of the user interface screen 52 to indicate this is the "PrimeFlix" video content provider website. The "Future Programs to Download when Available" area 54 shows an example implementation used to identify episodes in a series that the user 20a may wish to download and to watch once the content for the episode has been created and is available for download.

In one implementation, an episode list 56 allows the user 20a to select one of checkboxes 58 to identify a particular episode of "Better Call Saul" 56a-56f to download once the content for that episode has been created and is available. Here, the user 20a has selected Season 2 Episode 4 56d. The episodes in episode list 56 are examples of identifiable future video content that the user 20a can identify even though the content for that episode has not yet been created. As an additional way to identify video content, future series episodes that have not yet been filmed may be given a "Tribune ID," an "RUID" or other identifier instead of a season or episode number that will be used to uniquely identify the video content once it is created.

The user 20a may also select an "all future episodes" checkbox 60 to indicate that any future episode should be downloaded when the video content for that episode has been created and is available from the video-on-demand service 37a of the video content provider 46a. In some implementations, the "all future episodes" checkbox 60 may be associated with specific content such as one or more series, or with all content available from the video content provider 46a.

The "notify user when new content is available" checkbox 62 will cause the user 20a to be notified when any new content matching the user 20a selection has been newly created and is available for download. In this example, a notification will be sent to the email address "user@hotmail.com" 64. Thus, the user 20a will be notified when any future series episode videos, even those episodes currently unplanned or unanticipated by the producers of "Better Call Saul," are available for download and viewing.

In addition, a user configuration settings database 38*a* may be used to indicate where any newly created video content should be downloaded when the content becomes available. The download destination may be a user 20*a* device such as a personal computer 48 or other device. The download destination may also be at a network location that is accessible by the user 20*a* over communications network 42 via a device such as a personal computer 48.

Figure 3:
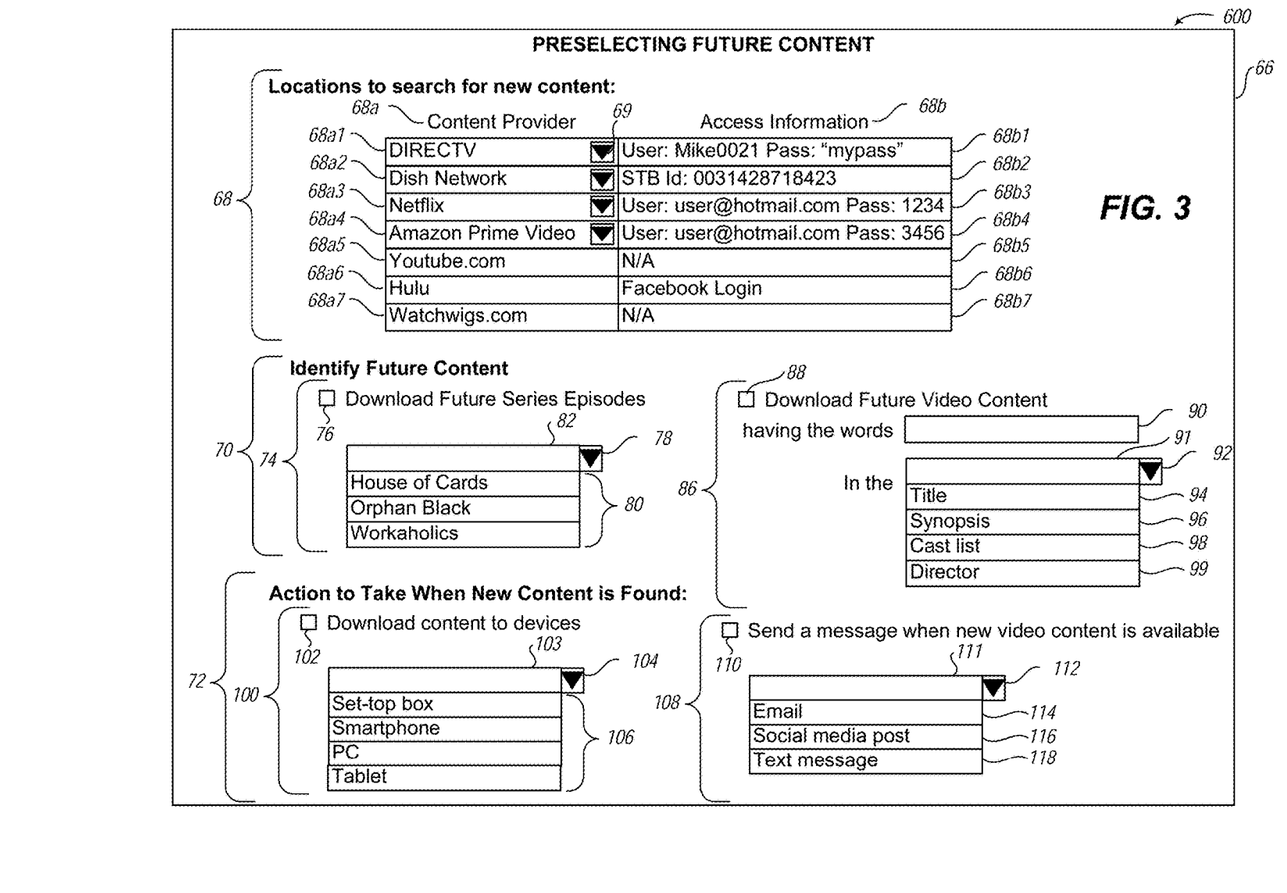
FIG. 3 contains an example user interface screen that shows an implementation of a user interface for configuring a preselecting future video content for download system running on a set-top box.

FIG. 3 contains an example user interface screen 600 that shows an implementation of a user interface for configuring a preselecting future video content for download system running on a set-top box. In this example, the user 20 accesses the preselecting future video content for download system 32 on the set-top box 24 using remote control 22 and television display 26. In other implementations, a user interface with similar, additional or fewer features and functions may be used in conjunction with other devices to interact with the preselecting future video content for download system 32.

User interface 66 for preselecting future content is displayed to the user 20 and is used for entering information that will be used to create search criteria to identify newly created video content to download from video content providers 46, 46*a*, for setting notifications for the user 20 when the newly created video content is found and for identifying the devices and locations to where newly created video content should be downloaded.

The "locations to search for new content" area 68 includes an area to identify one or more content providers 68*a* and the associated content provider access information 68*b* required to allow access to search for newly created video content at the identified video content provider sites 46, 46*a*. In this implementation, the user 20 enters the name of each content provider by typing the name into content provider input fields 68*a*1-68*a*7, or by using a drop-down box 69 to select content providers that are already known to the system. The user 20 then enters access information in the corresponding access information input fields 68*b*1-68*b*7. Access information may include the identification of a website, a user name, a password, an identification number and the like, or credentials from another authentication service such as Facebook™. In one or more implementations, the list of content provider names and corresponding access information is stored in the user configurations settings database 38.

The "identify future content" area 70 allows the user 20 to identify the future video content to be searched for and downloaded when the content has been newly created and available on the designated video content providers 46, 46*a*. This area includes a "download future series episodes" section 74 and a "download future video content having the words" section 86. The "download future series episodes" section 74 includes a checkbox 76 that indicates that the user 20 wants to search using search criteria detailed in the section 74. The user 20 then enters a series name into the textbox 82, or alternatively selects a drop-down menu 78 to display known series names 80 from which the user 20 may select. The known series names 80 may be determined in a number of ways, for example by analyzing the series names watched in the past or by identifying all or a subset of all of the series that are available from video content providers identified in the "locations to search for new content" area 68.

The "download future video content having the words" section 86 includes a checkbox 88 that indicates that the user 20 wishes to search video content providers 46, 46*a* using search criteria described in this section. In this example, the user 20 enters keywords into the text input field 90 that will be used as search criteria for searching for newly created video content. In some implementations this text may be formatted as a Boolean search expression, or as a natural language search expression. The user 20 may also narrow the search by indicating to which attributes of the content the search is to apply by entering the attribute text into a textbox 91. The user 20 may also select one or more attributes using a drop-down menu 92 which shows a list of attributes for the user to select, including but not limited to "Title" 94, "Synopsis" 96, "Cast list" 98 and "Director" 99. For example, a user 20 may enter "Breaking Bad" in the textbox 90 and select "Title" 94 using the drop-down menu 92. This will create search criteria that will identify any future content when it is newly created having "Breaking Bad" in the title, such as future episodes or reunion shows. In another example, entering "Vince Gilligan" in the textbox 90 and selecting "Director" 99 using the drop-down menu 92 will cause any future content in which Vince Gilligan is a director to be found.

The "action to take when new content is found" area 72 is used to specify the actions to take when newly created video content is found. It includes a "download content to devices" section 100 and a "send a message when new video content is available" section 108. The "download content to devices" section 100 includes a checkbox 102 that allows the user 20 to identify those devices to which content is to be downloaded when found. Alternatively, a drop-down menu 104 may be used to identify a menu 106 of various options for devices to select, such as set-top box, smartphone, personal computer and tablet. Alternatively, the name or other identification of a device may be entered directly into textbox 103. In a variation of this implementation, multiple devices may be selected from menu 106. In still other variations, an email address, social networking site, or other such download destinations may be included in the menu 106. Additional information about accessing the identified device or location may be taken from the user configuration settings database 38.

Once a download device is specified, the method by which the video content is downloaded to device may be identified. For example, the selecting video content for download system 32 may take into account the connection speeds to the download device, the impact that downloading a newly created video file will have to the connection speed, and the storage capacity of the download device. As a result, portions of the video content may be downloaded at different times of the day, or a different data-speed rates based on the user 20 preferences found in the user configuration settings database 38.

The "send a message when new video content is available" section 108 includes a checkbox 110 that indicates that the user 20 wants to receive a notification when newly created video content is found. A drop-down menu 112 is used to indicate the selection of a notification method including, but not limited to, "Email" 114, "Social media post" 116 or "Text message" 118. Any specific addresses identifying the destination of the notification method, for example email address or phone number to receive the text, may be subsequently entered by the user 20, or may be found in the user configuration settings database 38. In other implementations, the user 20 enters the notification method in a textbox 111.

In variations of other implementations, the information that is provided in user interface screen 66 may be determined from other sources. This information may be found, for example, by analyzing the viewing habits of the user 20, by analyzing other actions such as purchases made or travel habits, or by analyzing attributes such as age, sex, marital status, and the like.

Figure 4:
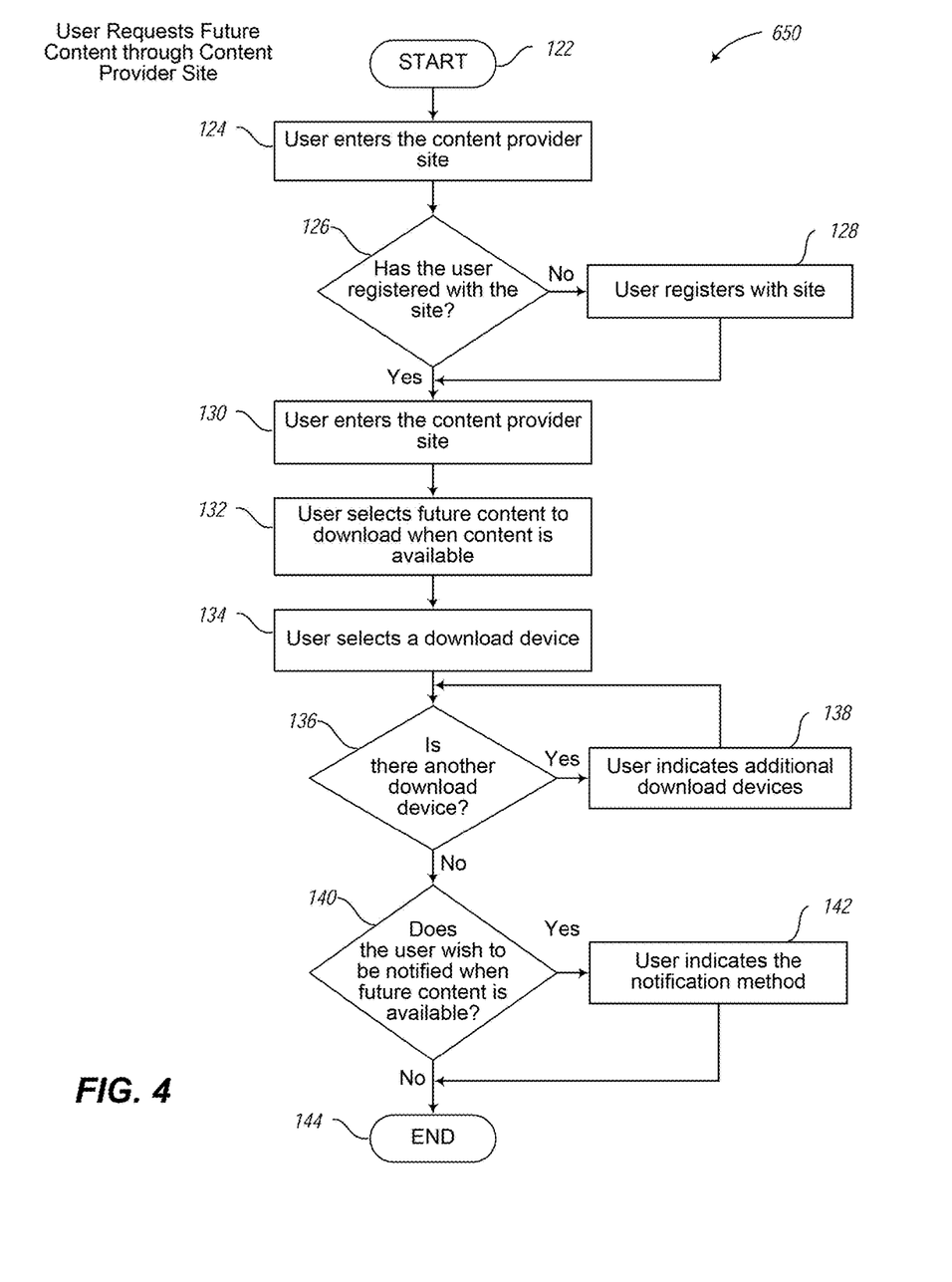
FIG. 4 contains a flow diagram that shows one implementation of a method for requesting future content to be provided through a content provider site that is implementing a system for preselecting future video content for download.

FIG. 4 contains flow diagram 650 that shows one implementation of a method for requesting future content to be downloaded from a content provider site that implements a system for preselecting video content for download 32a. This method corresponds to the example user interface 52 screen found in FIG. 2. The method starts at step 122.

At step 124, the user enters the content provider site. In one or more implementations, this involves using an Internet browser to identify a uniform resource locator address that will open an Internet-based portal to the content provider site, for example "www.primeflix.com." In other implementations, the content provider site may be accessed by an application running on a tablet 34 or smartphone 35, or by an application running on a set-top box 24.

At step 126, the system determines whether the user has registered with the site. If not, then at step 128 the user registers with the site. Registration allows user 20a to access the site and may involve paying a subscription fee for the ability to enter the content provider site, or by identifying membership in other related services that provide access to the content provider site as a benefit, for example an Amazon Prime™ membership. Typically, after registration the user 20a is given a user name and password to use to access the site. In some examples such as YouTube™ registration may not be required at all.

At step 130, the user enters the content provider site. This may be done by entering a user name and password, or by providing some other credential that allows the user to enter the site, or signing in with a Facebook™ account.

At step 132, the user then selects future content to download when the content is available. As shown in FIG. 2, this may involve identifying future content by selecting identified content that has not yet been created as shown on a user interface screen 52, or by entering in search criteria using keywords, Boolean search expressions, or natural language expressions. It may also involve identifying specific attributes of newly created content to be searched, such as title, synopsis, cast list or director.

At step 134 the user then selects a download device. This may involve indicating a specific device for download by using a device identification number, an internet address, an authentication scheme that identifies and pairs the device to another known device, an application downloaded to the device that is able to identify itself, or other device selection method.

At step 136, the method determines whether there is another download device to which the user wishes to download available content. If so, then at step 138, the user indicates additional download devices and the method goes back to step 136.

Otherwise, at step 140, the method determines whether the user wishes to be notified when new content has been found and is available for download and viewing. If so, at step 142, the user indicates the notification method. In one or more implementations, the notification method may include email, voicemail, text messaging, notification via a smartphone 35 or personal computer 48-based application, and the like.

The method ends at 144.

Figure 5:
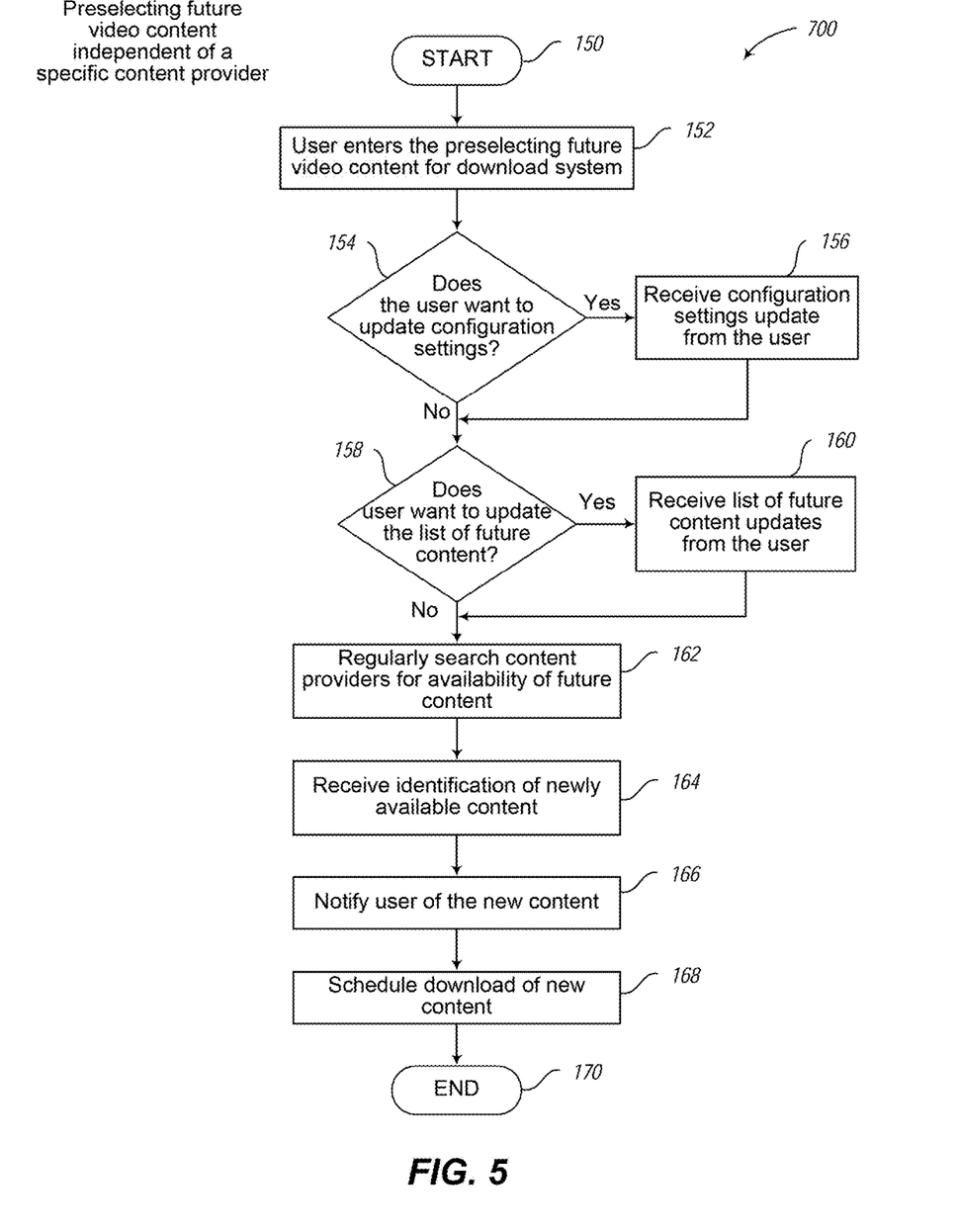
FIG. 5 contains a flow diagram that shows one implementation of a method for preselecting video content for download that is independent of a specific content provider.

FIG. 5 contains flow diagram 700 that shows one implementation of a method for preselecting future video content for download that is independent of a specific content provider. Although a preferred implementation is for the method to run on a set-top box 24, in other implementations this method may run on other devices such as a personal computer 48, tablet 34, or smartphone 35, or on a service provided by a third party accessible through an internet portal, or the like. This method corresponds to the example user interface 66 found in FIG. 3. The method starts at 150.

At step 152, the user enters the preselecting future video content for download system. This may be done by the user 20 selecting an icon on television display 26 using remote control 22, or through an interaction with another input device.

At step 154, the method determines if the user wants to update configuration settings. For example, the user 20 is given the option to review configuration settings and to indicate whether the settings should be updated. These settings include the list of locations to search for new content as referenced in FIG. 3 callout 68, the list of devices new content should be downloaded to as referenced in FIG. 3 callout 100, and the list of message notification choices when new video content is available as referenced in FIG. 3 callout 108. If the user wishes to update the configuration settings, then at step 156 the method receives updates from the user. These updates may be received as text entered from the user or as updates from analyzed habits of the user such as video programs watched, items purchased or travel habits, or from analyzed attributes of the user such as age, sex, marital status and the like. This updated information is stored in the user configuration settings database 38.

At step 158, the method determines if the user wants to update the list of future content. If so, then at step 160 the method receives a list of future content updates from the user and stores this updated information in the future content list database 36. The future content list database 36 includes information used to identify what future video content the user would like to download and view when the content has been created and is available. The identification may take the form of search criteria to identify the content that may be based, for example, on keywords, Boolean search expressions, or natural language expressions used to search content provider locations for newly available matching content. As described in the previous step, these updates may be received as text entered from the user or as updates from monitored habits of the user including attributes of video programming the user 20 normally watches.

At step 162, the method regularly searches content providers for the availability of future content. In one or more implementations, the search queries stored in the future content list database 36 as described in step 160 are used to search the video content providers that are identified in the user configuration settings database 38. The frequency of the queries may be determined in a number of ways, including from the video content provider 46, 46a or from the user 20 as stored in the user configuration settings database 38. One implementation of step 162 is described by flow diagram 750 in FIG. 6.

At step 164, the method receives an identification of newly available content from the previous step. This may include, but is not limited to, an identification of the video content provider 46, 46a, the title of the video content, or an identification number of the content as determined by the video content provider 46, 46a.

At step 166 the method notifies the user of the new content. In some implementations this is done in the manner that the user 20 specified in the user configuration settings database 38. Examples include, but are not limited to, text notification and email notification.

At step 168 the method will schedule a download of the new content. In some implementations this is done in the manner that the user 20 specified in the user configuration settings database 38. For example, the download may begin immediately, or the download may be delayed or the download rate may be slowed to not impact bandwidth throughput to the download device.

The method ends at step 170.

Figure 6:
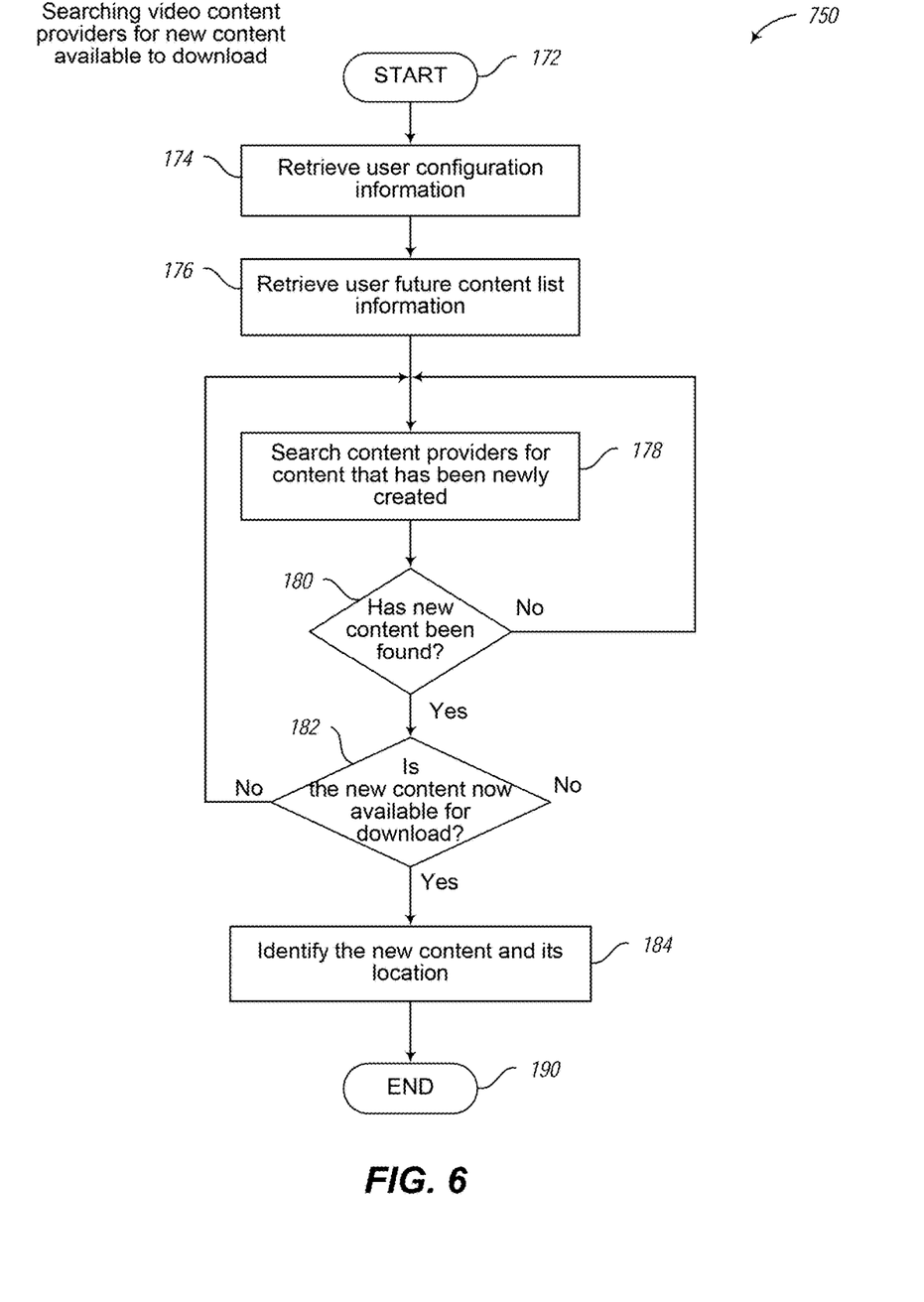
FIG. 6 contains a flow diagram that shows one implementation of a method for searching video content providers for available content to download.

FIG. 6 contains flow diagram 750 that shows one implementation of a method for regularly searching video content providers for available content to download.

The method starts at step 172. At step 174, the method retrieves user configuration information. User configuration information may be retrieved from the user configuration settings database 38 or from any other source that contains user configuration information as described above. This includes the identification of one or more video content providers 46, 46a and corresponding access information as described above.

At step 176, the method retrieves the user future content list information. This information may be retrieved from the future content list database 36, or from any other source contains a list of the user's desired future video content that is not yet created. In one or more implementations, this information may be represented by one or more search criteria, for example keyword searches that identify words associated with a series name (e.g., "Orphan Black"), with a particular topic (e.g., "Civil War" or "Kissinger"), or with a particular cast member (e.g., "Matt Damon"). In other embodiments the search criteria could contain a Boolean search expression such as "title contains 'breaking' and director=Gilligan", or a natural language search expression such as "download any newly created videos relating to manned space missions to Mars."

At step 178, the method then searches content providers to identify content that has been newly created. The method uses the search criteria from the future content list database to perform the searches across all identified video content providers 46, 46a.

At step 180, the method determines if new content has been found. If not, the method goes back to step 178.

Otherwise, at step 182, the method determines whether the new content is available for download. If it is not, then the method goes back to step 178.

If the identified newly created video content is available for download, then at step 184 the method identifies the new content and its location. This information is then returned, allowing the newly created content to be located and to be downloaded, and the method ends at 190. Otherwise, the method goes back to step 178.

Figure 7:
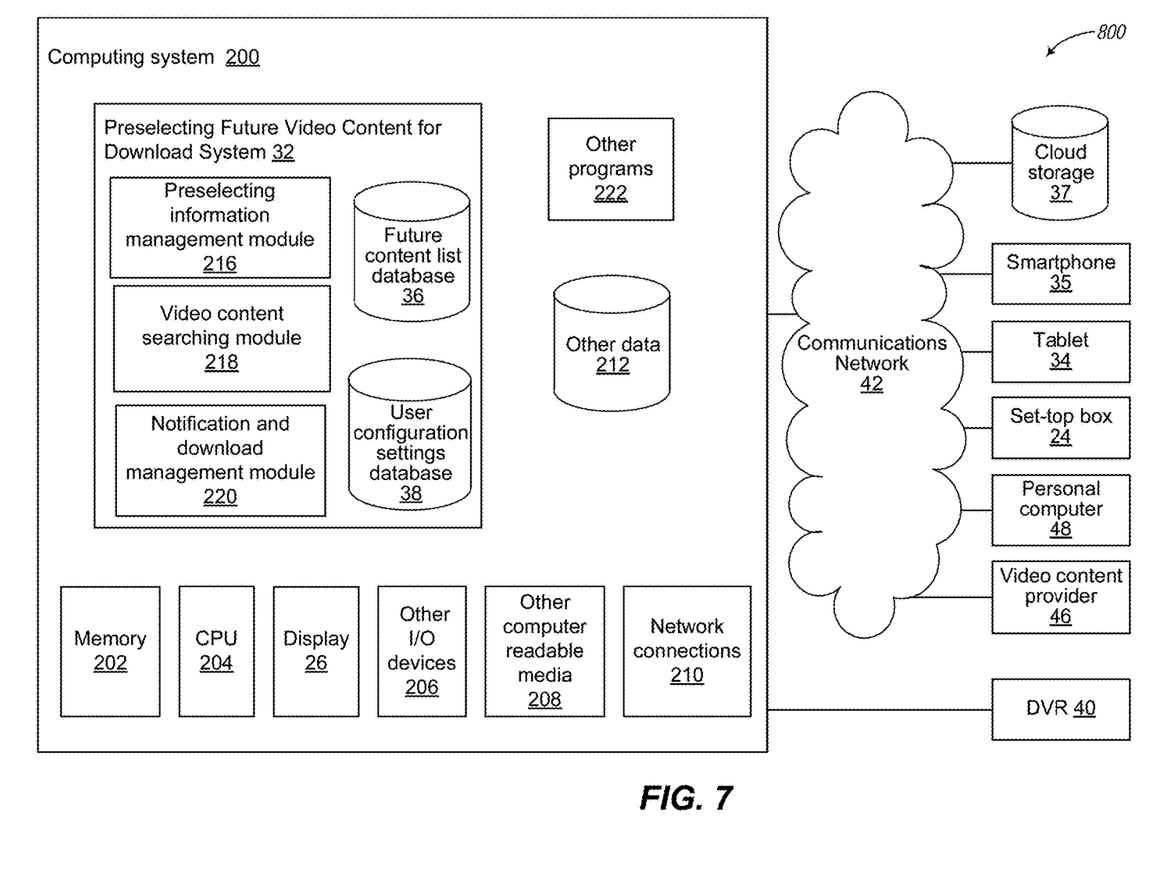
FIG. 7 contains a diagram that shows one implementation of system and components for providing preselecting future video content for download.

FIG. 7 shows diagram 800 of one implementation of a computing system for implementing a preselecting future video content for download system 32. FIG. 7 includes a computing system 200 that may be utilized to implement the preselecting future video content for download system 32 with features and functions as described above. One or more general-purpose or special-purpose computing systems may be used to implement the preselecting future video content for download system 32. More specifically, the computing system 200 may include one or more distinct computing systems having distributed locations, such as within a set-top box, within a personal computing device, or distributed throughout a network such as the Internet. In addition, each block shown may represent one or more such blocks as appropriate to a specific embodiment, or may be combined with other blocks. Moreover, the various blocks of the preselecting future video content for download system 32 may physically reside on one or more machines, which may use standard inter-process communication mechanisms (e.g., TCP/IP) to communicate with each other. Further, the preselecting future video content for download system 32 may be implemented in software, hardware, and firmware or in some combination to achieve the capabilities described herein.

In the embodiment shown, computing system 200 includes a computer memory 202, one or more Central Processing Units ("CPUs") 204, a display 26, other input/output devices 206 (e.g., keyboard, mouse, joystick, track pad, LCD display, smartphone display, tablet and the like), other computer-readable media 208 and network connections 210 (e.g., Internet network connections or connections to video content distributors) connecting to, for example communications network 42. In other embodiments, some portion of the contents of some or all of the components of the preselecting video content for download system 32 may be stored on and/or transmitted over other computer-readable media 208 or over network connections 210. The components of the preselecting future video content for download system 32 preferably execute on one or more CPUs 204 to manage receiving one or more indications from a user 20 of future video content to be downloaded when the content has been created, to facilitate the searching of one or more video content providers 46, 46a to identify newly created video content and to downloading the identified content for viewing by the user 20, 20a.

Other programs 222 (e.g., code, a Web server, a database management system, and the like), and potentially one or more other data repositories 212, preferably execute on one or more CPUs 204. Not all of the components in FIG. 7 are required for each implementation. For example, some embodiments embedded in other software do not provide means for user input, for display, for a customer computing system, or other components, such as, for example, a set-top box or other receiving device receiving or storing video content.

In a typical embodiment, the preselecting video content for download system 32 includes a preselecting information management module 216, a video content searching module 218 and a notification and download management module 220.

In one or more implementations, the preselecting information management module 216 receives information from a user 20 who wishes to identify audiovisual content that has not yet been created and to receive notification and/or download the content once the desired video content has been created. As non-limiting examples, the user 20 may use a remote control 22 to interact with a menu system running on set-top box 24 using television display 26, with an application running on a tablet 34 or a smartphone 35, or with an application running on a personal computer 48 to enter in one or more search criteria for future video content for downloading into the preselecting information manager module 216. In another example a user 20a may use a personal computer 48 to access a video content provider 46a site that offers a preselecting video content for download system 32a and to enter one or more search criteria for future video content for download into the preselecting information manager module 216.

The search criteria is then sent to the video content searching module 218 for conducting regular searches of video content providers 46, 46a to identify if the future video content desired by the user 20 has been created and if the content is available for downloading. If the desired video content is available, the notification and download management module 220, based on information provided by the user to the preselecting information manager module 216, will notify the user 20, 20a that the desired content is available and download the content for later viewing.

Other and/or different modules may be implemented. The preselecting future video content for download system 32 also, in some implementations, contains the user configurations settings database 38 that includes information about the user 20 preferences including preferences for the video content providers 46, 46a to be searched, devices to which identified new video content should be downloaded, and the ways the user 20 should be notified when the download is complete and the video content is available for viewing. In addition, the future content list database 36 includes one or more ways to identify future video content, for example by search criteria including keyword, Boolean expression and natural language search expression, to search for and identify future video content that the user 20 wishes to download from video content providers 46, 46a and view once the content has been created.

In addition, the preselecting future video content for download system 32 interacts with communications network 42 to communicate with smartphones 35, tablets 34, personal computers 48 and set-top boxes 24 that serve as user interface devices for the user 20, 20a and to also communicate with devices that will receive downloaded video content. In addition, the system interacts with video content providers 46, 46a as it searches for video content that has been newly created, including providing access credentials to the video content providers 46, 46a to enable searches to be performed. In one or more implementations, a video content provider 46 may be a content subscription service such as but not limited to DIRECTV™, DISH®, Netflix™, Amazon Prime Video™, Hulu™, YouTube™, WIGS™, Twitch™ and other content providers that may either be or not be subscription-based.

The preselecting information management module 216 performs at least some of the functions as described with reference to FIGS. 1-5. In particular, the preselecting information management module 216 interacts with the user 20 to receive and store preferred settings for the user 20 in the user configuration settings database 38 and to identify future video content to be downloaded in the future content list database 36. The user configuration settings database 38 includes user 20 notification procedures when new video content relevant to the user 20 is found, as well as a list of devices to which the future video content should be downloaded after the content has been created.

The future content list database 36 identifies future video content that has not yet been created either through name, search criteria, or other method of identification. In one or more implementations, a user interface, such as shown in FIGS. 2 and 3, is used by the user 20 to enter the data into the future content list database 36. In other implementations, the preselecting information management module 216 will analyze other data such as past video content purchases, video content viewing, product purchase and attributes of the user 20 to create search criteria or other identification methods used to search for video content providers 46, 46a for newly created content desired by the user 20. The results of this analyzed data are added to the user configuration settings database 38 and/or future content list database 36.

For example, if videos are normally purchased and downloaded to a particular smartphone 35 for viewing, based on the user 20 purchasing patterns the preselecting information management module 216 will set the user 20 device to receive downloads to that smartphone 35. In addition, the smartphone 35 may be identified as a notification device and a text message may be sent to the smartphone 35 when new video content has been downloaded. In another example, if the user 20 frequently rents and views documentaries produced by Ken Burns, then the preselecting information management module 216 will identify this activity and create search criteria to identify any future video content created that has been produced by Ken Burns, and add that search criteria to the future content list database 36 for regular content searching.

The video content searching module 218 performs at least some of the functions as described with reference to FIGS. 1, 5, and 6. The video content searching module 218 searches for newly created content that is desired by the user 20 and that is available from video content providers 46, 46a. The video content searching module 218 receives information from the future content list database 36 which includes information such as series names or search criteria to identify content that has not yet been created to download to a user 20 device for viewing. The module also interacts with user configuration settings database 38 that includes, for example, the list of video content providers 46, 46a to search.

The video content searching module 218 sends requests through communications network 42 to various video content providers 46, 46a. These content providers include but are not limited to DIRECTV™, DISH®, Netflix™' Hulu™, or Amazon Prime Video™, as well as user-created content on sites such as YouTube™ and Twitch™. Once the video content searching module 218 has identified newly created content that matches the search criteria, the information for where the newly created video content is located and how the content can be accessed is passed to the notification and download management module 220.

The notification and download management module 220 performs at least some of the functions as described in FIGS. 1, 5 and 6. The location of identified content that has been newly created is received from the video content searching module 218. The notification and download management module 220 then retrieves the video content from the location and downloads the content to the devices that are specified in the user configuration setting database 38. In one or more implementations, the notification and download management module 220 manages the downloading of the content to the user devices to take into account the bandwidth of the communication link with the download device so that the downloading process does not unduly affect the ability of the user 20 to use the communications bandwidth to the download device for other purposes. In addition, the storage capacity of the identified download device may also be considered. This way, if the user has limited storage, the notification and download management module 220 may, for example, only download a part of the content as needed or change the resolution of the content, or otherwise modify the content so that it takes up a smaller size on the download device. In one or more implementations, once the video content has been downloaded to the user's device, a notification is sent to the user indicating that the content is available for viewing. The notification may be sent via email, text message, voicemail, or other method as specified by the user 20 in the user configuration settings database 38.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a system for preselecting future video content for download, comprising:
   presenting, by the system for preselecting future video content for download, a menu for preselecting future video content for download, presenting the menu including:
      presenting, in the menu, a list of content providers;
      presenting, in the menu, a field for a user to enter one or more typed entries as search criteria for the content providers; and
      presenting, in the menu, a field for the user to enter search criteria for the future video content;
   receiving, by the system for preselecting future video content for download, an indication from the user using the menu of a plurality of content providers to be searched for content that is not yet created and loaded for download by the plurality of content providers, the plurality of content providers including a first set of content providers and a second set of content providers, receiving the indication of the plurality of content providers to be searched including:
      receiving, from the user, a selection of the first set of content providers made from the list of content providers; and
      identifying, based on the search criteria for content providers, the second set of content providers, the second set of content providers being different from the first set of content providers;
   receiving, by the system for preselecting future video content for download, a selection of content from the menu using the entered search criteria for the future video content;
   associating, by the system for preselecting future video content for download, the selected content and the plurality of content providers;
   storing, by the system for preselecting future video content for download, the association of the selected content and the plurality of content providers;
   searching the plurality of content providers for the selected content;
   determining that the selected content has been loaded for download by one or more content providers of the plurality of content providers; and
   in response to determining that the selected content has been loaded for download by the one or more content providers of the plurality of content providers, initiating a download, by the system for preselecting future video content for download, of the selected content to a user device.

2. The method of claim 1, wherein initiating the download of the selected content further comprises downloading the selected content to a local storage on the user device.

3. The method of claim 1, wherein initiating the download of the selected content further comprises downloading the selected content to a storage area on a network accessible to the user device.

4. The method of claim 1, further comprising after initiating the download of the selected content:
   upon completion of the download of the selected content, sending, by the system for preselecting future video content for download, a message to the user indicating that the download of the selected content has been completed.

5. The method of claim 1, wherein the indication of content to be located further includes search criteria received from a database.

6. The method of claim 5, wherein the search criteria includes one of a keyword search and a Boolean search expression.

7. The method of claim 1, comprising:
   receiving, by the system for preselecting future video content for download, an indication of a frequency of searching the plurality of content providers for the selected content, the indication of the frequency of searching the plurality of content providers being received from the user; and
   searching the plurality of content providers for the selected content in accordance with the indicated frequency.

8. The method of claim 1, comprising:
   receiving, by the system for preselecting future video content for download, from the user an indication of a scheduling time for downloading the selected content to the user device; and
   downloading, by the system for preselecting future video content for download, the selected content to the user device in accordance with the indicated scheduling time.

9. The method of claim 1, wherein presenting the menu includes:
   analyzing user profile information and user viewing habits to determine future video content to be searched;
   determining, based on analyzing the user profile information and the user viewing habits, the future video content to be searched; and
   presenting a list of the determined future video content to be searched in the menu.

10. The method of claim 9, wherein the user profile information includes at least one of: age, sex, marital status, and income, and wherein the user viewing habits includes at least one of: past video content purchases and video content viewing.

11. A system for downloading future content, comprising:
    at least one processor; and
    at least one non-transitory memory coupled to the at least one processor, wherein the at least one processor:
       presents a menu for preselecting future video content for download, presenting the menu including:
          presenting, in the menu, a list of content providers;
          presenting, in the menu, a field for a user to enter one or more typed entries as search criteria for the content providers; and
          presenting, in the menu, a field for the user to enter search criteria for the future video content;
       receives an indication from the user using the menu of a plurality of content providers to be searched for audiovisual content that is not yet created and loaded for download by the plurality of content providers, the plurality of content providers including a first set of content providers and a second set of content providers, receiving the indication of the plurality of content providers to be searched including:
- receiving, from the user, a selection of the first set of content providers made from the list of content providers; and
- identifying, based on the search criteria for content providers, the second set of content providers, the second set of content providers being different from the first set of content providers;

receives a selection of content from the menu using the entered search criteria for the future video content;

associates the selected audiovisual content and an indication of the plurality of content providers;

stores the selected indication of the audiovisual content and the indication of the plurality of content providers;

searches the plurality of content providers for the selected audiovisual content;

in response to searching the plurality of content providers for the selected audiovisual content, determines that the selected audiovisual content has been loaded for download by one or more content providers of the plurality of content providers; and in response to determining that the selected content has been loaded for download by the one or more content providers of the plurality of content providers, downloads the selected audiovisual content from a content provider of the one or more content providers to the user device.

12. The system of claim 11, wherein downloading the indicated audiovisual content further comprises downloading the selected audiovisual content to a local storage on the user device.

13. The system of claim 11, wherein downloading the selected audiovisual content further comprises downloading the selected audiovisual content to a storage area located on a network accessible by the user device.

14. The system of claim 11, further comprising after downloading the selected audiovisual content from the content provider:

sending a message to the user when the download has been completed.

15. The system of claim 14, wherein the message includes one of a text message and an email message.

16. The system of claim 11, wherein the selection of audiovisual content further includes search criteria received from a database.

17. The system of claim 11, wherein the at least one processor:
- receives an indication of a frequency of searching the plurality of content providers for the selected audiovisual content, the indication of the frequency of searching the plurality of content providers being received from the user; and
- searches the plurality of content providers for the selected audiovisual content in accordance with the indicated frequency.

18. The system of claim 11, wherein the at least one processor:
- receives from the user an indication of a scheduling time for downloading the selected audiovisual content to the user device; and
- downloads the selected audiovisual content to the user device in accordance with the indicated scheduling time.

19. The system of claim 11, wherein presenting the menu includes:
- analyzing user profile information and user viewing habits to determine future video content to be searched;
- determining, based on analyzing the user profile information and the user viewing habits, the future video content to be searched; and
- presenting a list of the determined future video content to be searched in the menu.

20. The system of claim 19, wherein the user profile information includes at least one of: age, sex, marital status, and income, and wherein the user viewing habits includes at least one of: past video content purchases and video content viewing.

* * * * *